United States Patent [19]

McCallister

[11] Patent Number: 4,474,230
[45] Date of Patent: Oct. 2, 1984

[54] FLUIDIZED BED REACTOR SYSTEM
[75] Inventor: Robert A. McCallister, Mountain Lakes, N.J.
[73] Assignee: Foster Wheeler Energy Corporation, Livingston, N.J.
[21] Appl. No.: 413,298
[22] Filed: Aug. 31, 1982
[51] Int. Cl.³ ............................................. F28D 15/00
[52] U.S. Cl. ................................ 165/104.21; 165/178
[58] Field of Search .............. 165/178, 104.21, 104.26, 165/104.16, 104.17

[56] References Cited
U.S. PATENT DOCUMENTS

| | | | |
|---|---|---|---|
| 2,672,736 | 3/1954 | Philipp | 165/104.21 |
| 2,948,555 | 8/1960 | Wright | 165/178 |
| 2,969,956 | 1/1961 | Forgo | 165/178 |
| 3,792,729 | 2/1974 | Perry | 165/178 |
| 3,875,926 | 4/1975 | Frank | 165/104.26 |
| 4,119,085 | 10/1978 | Knowles | 165/104.21 |
| 4,226,282 | 10/1980 | Kunsagi | 165/104.21 |
| 4,249,594 | 2/1981 | Elkins | 237/55 |
| 4,273,100 | 6/1981 | Cogliano | 165/104.21 |
| 4,279,293 | 7/1981 | Koump | 165/178 |
| 4,280,554 | 7/1981 | Stockman | 165/104.21 |

Primary Examiner—Daniel J. O'Connor
Attorney, Agent, or Firm—Marvin A. Naigur; John E. Wilson; Warren B. Kice

[57] ABSTRACT

A fluidized bed reactor system for introducing heat energy into or removing heat energy from fluidized reactants undergoing reaction includes, in a first embodiment, a fluidized bed reactor for fluidizing a particulate material in a fluidizing medium and a heat generator for supplying heat energy to the fluidized bed. A plurality of heat pipes interconnect the heat generator and the fluidized bed reactor with the evaporator portions of the heat pipes extending into the heat generator and the condenser portions thereof extending into the fluidized bed. Thermal energy from the heat generator is absorbed by the evaporator portions of the heat pipes and conveyed through the heat pipes to the condenser portions where the thermal energy is transferred to the fluidized bed. Since heat pipes transfer thermal energy at a relatively constant temperature throughout a wide range of thermal flows, heat energy can be introduced into endothermic fluidized reactions at a relatively constant temperature to achieve preferred reaction rates. In a second embodiment, the evaporator portion of the heat pipes extend into the fluidized bed and the condenser portions extend outwardly of the fluidized bed to a heat sink.

5 Claims, 6 Drawing Figures

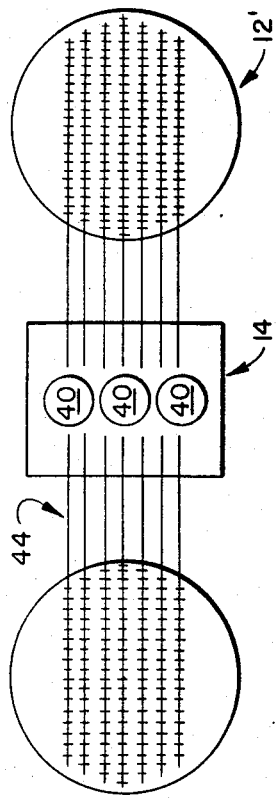
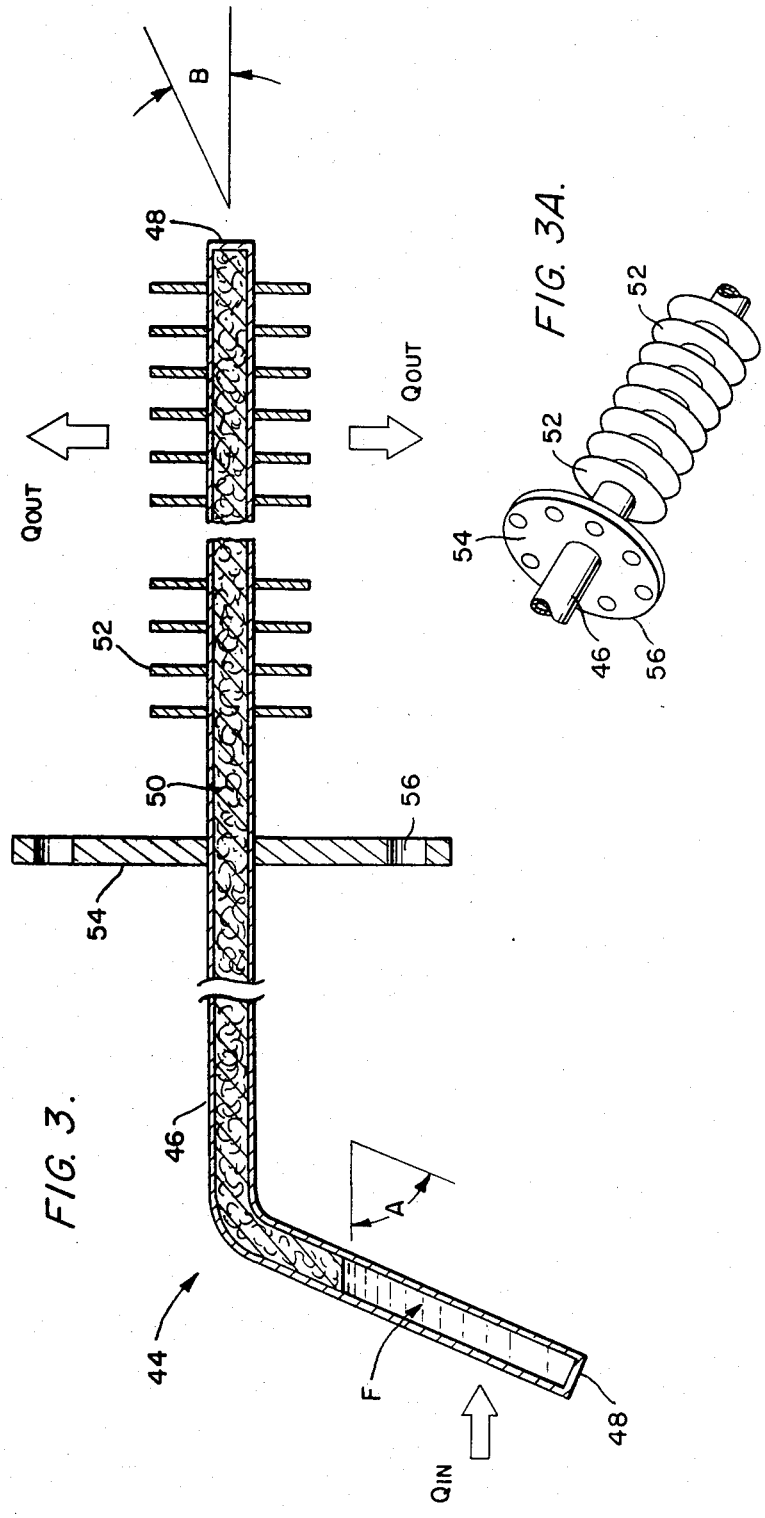
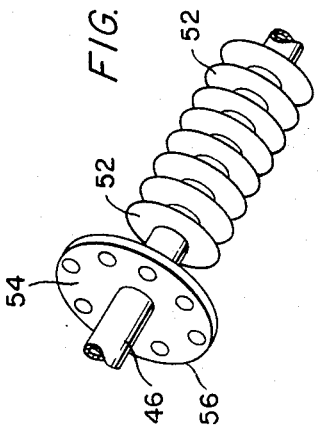

FLUIDIZED BED REACTOR SYSTEM

BACKGROUND OF THE INVENTION

The present invention relates to fluidized bed reactor systems and, more particularly, to fluidized bed reactor systems in which heat energy is introduced into or removed from the fluidized bed in order to provide the heat of reaction for an endothermic reaction or remove the heat of reaction from an exothermic reaction.

Fluidized bed reactors are frequently used for conducting chemical process reactions in which a particulate media is fluidized by a gaseous fluidizing medium. Typically, the fluidized particulate media is one of the reactants and is reacted with a gaseous fluidizing reactant to form the desired gaseous end product which leaves the fluidized bed area as an effluent. Fluidized beds are particularly useful in conducting reactions between two or more gaseous reactants in the presence of a solid catalyst, since the catalyst can be granulated and fluidized by the gaseous reactants. The desired reaction takes place within the fluidized bed area between the gaseous reactants with the gaseous end products then emerging from the fluidized bed for recovery and subsequent utilization. In general, the flow of the fluidized gases, be they reactants, carrier gases, or catalyst, and the size and turbulence of the fluidized particles can be controlled to assure sufficient reactant residence time to allow the reaction to go to completion and form the desired end product.

One problem associated with the use of fluidized bed process reactors is that of accommodating the heat of reaction, that is, adding heat energy to an endothermic reaction and removing excess heat energy from an exothermic reaction. This problem is especially critical when the reaction must occur at a preferred temperature to provide optimum reaction efficiency.

In many fluidized bed systems, coil loops or coil systems are immersed within the fluidized bed and a heat transfer fluid is passed through the coils to either add or remove heat from the bed with the heat energy transferred dependent upon the relative temperature difference between the heat transfer fluid within the coils and the fluidized bed. Since the heat transfer fluid generally travels along an extended path through the coils, the temperature of the fluid can vary greatly as a function of the length of the path travelled and can cause uneven temperature distribution in the fluidized bed. In those cases where it is especially critical that the reaction take place within a relatively narrow, preferred temperature range, these temperature gradients can materially affect the reaction efficiency.

SUMMARY OF THE INVENTION

In view of the above, it is a primary object of the present invention to provide a fluidized bed reactor system for conducting chemical process reactions in which the heat of reaction is efficiently accommodated, that is, by introducing heat energy into the fluidized bed in the case of endothermic reactions or by removing heat energy from the fluidized bed in the case of exothermic reactions.

It is another object of the present invention to provide a fluidized bed reactor system for conducting endothermic chemical reactions in which heat energy is conveyed into the fluidized bed at a relatively constant temperature throughout a broad range of heat flows.

It is also another object of the present invention to provide a fluidized bed reactor system for conducting exothermic chemical process reactions in which heat energy is conducted out of the fluidized bed at a relatively constant temperature throughout a wide range of heat flows.

In accordance with these objects, and others, the present invention provides, in a first embodiment for endo-thermic reactions, a fluidized bed reactor and a heat generator thermally interconnected by a plurality of heat pipes. The evaporator portions of the heat pipes extend into the heat generator and the condenser portions of the heat pipes extend into the fluidized bed reactor so that heat energy from the heat generator will be conveyed into the fluidized bed reactor. In operation, a particulate material, either a reactant or a catalyst, is fluidized by a gaseous fluidizing medium which may be a mixture of gaseous reactants. Thermal energy from the heat generator is transferred through the heat pipes to their respective condenser sections where it is transferred to the fluidized bed. Since heat pipes transfer thermal energy at a relatively constant temperature throughout a wide range of thermal flows, thermal energy is transferred at an essentially constant temperature to control or otherwise moderate the temperature of the reaction while supplying the necessary thermal energy for the reaction to efficiently go to completion. In a second embodiment, the evaporator sections of the heat pipes extend into the fluidized bed to remove thermal energy from an exothermic reaction with the condenser portions of the heat pipes thermally connected to a suitable heat sink. Thermal energy is removed from the exothermic reaction at a relatively constant temperature throughout a broad range of thermal flows to control and moderate the temperature of reaction while removing the excess heat energy. Since the heat pipes can be designed to transfer heat at a relatively fixed temperature by proper selection of the working fluid within the heat pipe and the internal pressure, the temperature of fluidized bed reactions, be they endothermic or exothermic, can be conveniently controlled.

BRIEF DESCRIPTION OF THE DRAWINGS

The above description as well as further objects, features, and advantages of the present invention will be more fully understood by reference to the following description of presently preferred but nonetheless illustrative embodiments in accordance with the present invention, when taken in connection with the accompanying drawings, wherein:

FIG. 2 is a schematic plan view, in cross section, of the fluidized bed reactor system shown in FIG. 1;

FIG. 3 is a side elevational view, in cross section, of an exemplary heat pipe for thermally connecting the heat generator and the fluidized bed reactor of FIGS. 1 and 2;

FIG. 3A is a partial perspective detailed view of the heat pipe shown in FIG. 3;

DESCRIPTION OF THE PREFERRED EMBODIMENT

Figure 1:
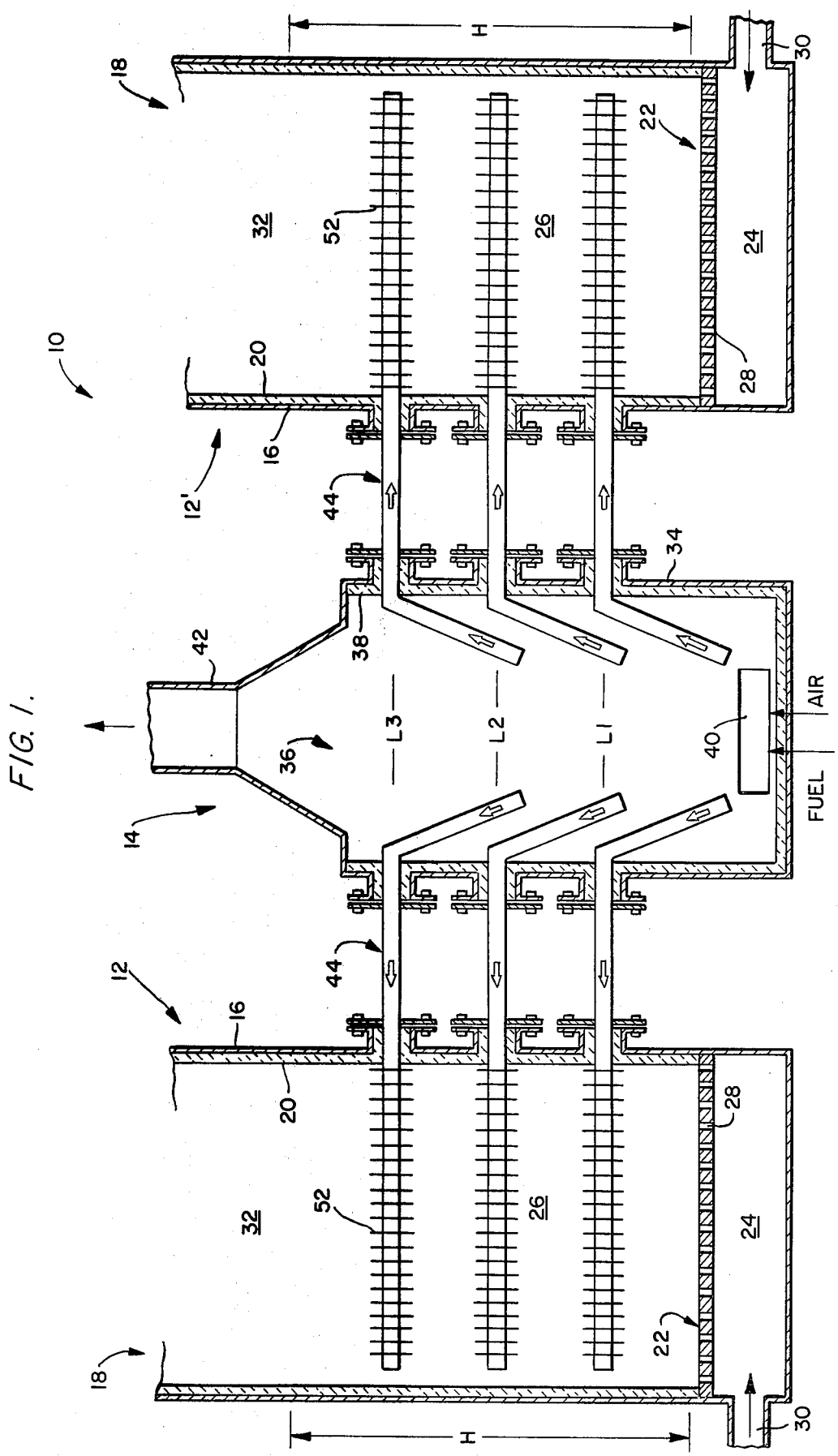
FIG. 1 is a side elevational view, in partial cross section, of a fluidized bed reactor system that includes a centrally located heat generator and fluidized bed reactors on either side of the heat generator.

A preferred embodiment of a fluidized bed reactor system in accordance with the present invention is shown in FIGS. 1 and 2 and is generally referred to therein by the reference character 10. The fluidized bed reactor system 10 includes first and second fluidized bed reactors 12 and 12' and a centrally located heat generator 14. The fluidized bed reactors 12 and 12' each includes a vessel wall 16 that defines an enclosed volume 18. A lining 20 of fire brick or other refractory material is provided to protect the vessel wall 16 against abrasive and thermal damage. A distribution plate 22 is located at the lower end of the fluidized bed reactors 12 and 12' to define a fluidizing gas plenum 24 beneath the distribution plate 22 and a fluidized bed area 26 above the plate.

The distribution plate 22 includes a plurality of apertures 28 that are designed to divide a fluidizing gas flow that enters the fluidizing gas plenum 24 through an inlet port 30 into a plurality of vertically upward streams, as is known in the art. As discussed below, the gaseous supply stream can be a mixture of reactants that undergo a reaction in the fluidized bed area 26 above the distribution plate 22 with the reaction products emerging from the fluidized bed area in the freeboard area 32 where the reaction products are removed through conventional means.

The heat generator 14 includes a vessel wall 34 that defines an enclosed volume 36. A lining 38 of fire brick or other refractory material provides thermal protection for the vessel wall. At least one and preferably a plurality of burners 40 are located within the heat generator 14. Combustion air and a suitable fuel (fuel oil, gas, etc.) are provided to the burners 40, as schematically indicated by the arrows in FIG. 1, mixed in the burner, and combusted to release heat energy. The products of combustion are removed from the heat generator 14 through a stack 42 in a conventional manner.

A plurality of heat pipes 44 are provided to effect a thermal connection between the fluidized bed reactors 12 and 12' and the heat generator 14. As shown in FIG. 1, the heat pipes 44 are arranged in several tiers or levels L1, L2, and L3 and, as shown in FIG. 2, each level includes a plurality of adjacent heat pipes. The heat pipes 44 may be arranged in a regular array or an irregular staggered array.

As shown in FIG. 3, each heat pipe 44 includes an elongated tube 46 preferably fabricated from a corrosion and abrasion resistant, high temperature metal that is sealed by suitable plugs 48 at each end of the tube to effect hermetic sealing of the interior of the heat pipe. The tube 46 is bent, that is, one portion is inclined relative to the other, at a selected angle A that can include, for example, the angle 90°. A selected quantity of heat transfer working fluid F is sealed into the tube at a selected vapor pressure to effect heat transfer as explained below. The choice of the working fluid depends upon the operating temperature and heat transfer requirements of the application and can include, for example, light hydrocarbons, ammonia, potassium, sodium, lithium, and other materials. When the heat pipe 44 is positioned as shown in FIG. 3, the working fluid F normally collects in the liquid phase in the inclined evaporator portion of the heat pipes, the remaining portion of the heat pipe being referred to as the condenser portion. In the embodiment shown in FIG. 3, a wicking material 50, which can take one of several forms including a fine wire mesh or screen is positioned in the tube 46 substantially along the entire interior wall, as is known in the art. A plurality of discoidal heat transfer fins 52, made from a corrosion and abrasion resistant high temperature metal, are mounted on the condenser portion of the heat pipe 44 in an equi-spaced fashion with a larger annualar mounting disc 54 welded or otherwise secured to the condenser portion of the heat pipe as shown in FIGS. 3 and 3A. The mounting disc 54 includes a plurality of mounting holes 56 formed on a predetermined bolt circle to facilitate the mounting of the heat pipes 44 to the fluidized bed reactors 12 and 12' and the heat generator 14 as described below.

The heat pipes 44 operate in a conventional manner in that heat energy introduced into the evaporator section of the heat pipe causes some of the liquid working fluid F to enter the vapor phase. The temperature at which vaporization occurs depends upon the particular working fluid F selected and the pressure within the tube. As the working fluid vaporizes, heat energy is absorbed from the surroundings with the so-evolved vapors being transferred through the tube 46 from the evaporator section to the condenser section where the vapor condenses and returns to the liquid phase and, in so doing, releases the heat energy absorbed during evaporation. The liquid condensate is absorbed by the wicking material 50 and returned to the evaporator section by capillary action. In the preferred embodiment, the condenser sections of the heat pipes 44 are mounted generally horizontal; however, the condenser sections can be mounted at an angle B relative to the horizontal so that the liquid condensate can return to the evaporator section under the influence of gravity. In this latter case, the wicking material 50 can be dispensed with so that the heat pipes operate in a manner similar to thermal siphons.

Figure 4:
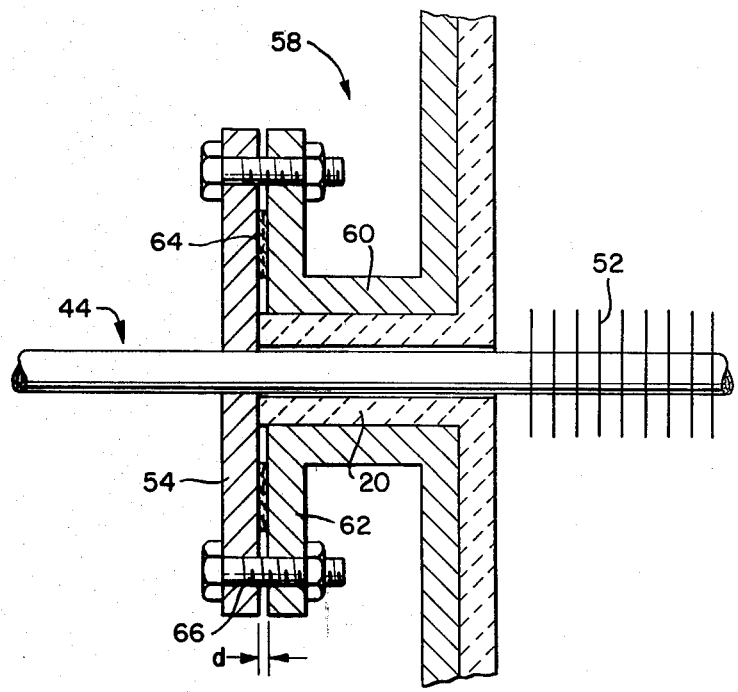
FIG. 4 is a detailed cross section view of a weld neck nozzle for installing a heat pipe in the fluidized bed reactor.

As shown in FIGS. 1 and 2, the fluidized bed reactors 12 and 12' and the heat generator 14 are thermally interconnected by the plural heat pipes 44 with the tubular condenser portion of each heat pipe passing through the respective vessel walls through a weld neck nozzle 58 as shown in detail in FIG. 4. Each weld neck nozzle 58 includes an outwardly extending tubular neck 60 that is lined with the refractory material 20 to define a clearance bore for the tubular portion of the heat pipe 44. An outwardly extending annular mounting flange 62 is located at the remote, outer end of the neck 60 with the refractory material 20 extending outwardly beyond the flange a selected distance "d." The mounting flange 62 includes plural bolt holes that are designed to register with those in the mounting disc 54.

In assemblying the heat pipes 44 to the fluidized bed reactors 12 and 12' and the heat generator 14, the tubular portion of each heat pipe 44 (without fins) is passed through the clearance bore defined by the refractory material 20 with a sealing gasket 64 positioned between the mounting disc 54 and mounting flange 62. The disc 54 and the flange 62 are then bolted together with suitable threaded fasteners 66 at their periphery so that the mounting disc 54 abuts the extended, remote end of the refractory material 20 with a clearance space provided between the mounting disc 54 and the flange 62. Thereafter, the fins 52 are mounted on and secured to the condenser portion of the heat pipe 44. By extending the outward end of the refractory material 20 beyond the mounting flange 62 to provide a clearance space between the mounting flange 62 and the mounting disc 54, a thermal insulation barrier is established so that the disc 54 can be fabricated from conventional rather than temperature resistant material. Alternate assembly techniques includes manufacturing or prefabricating the heat 44 pipe in separate sections, installing the various sections in place, and then welding the pieces together to form the completed heat pipe.

The heat pipes are connected to the heat generator 14 in a similar manner although the evaporator sections in the interior of the heat generator 14 are inclined relative the condenser sections as described above in connection with FIG. 3 to a expose a larger radiation receiving surface to the burners 40.

In operation, a particulate material, such as a solid catalyst in granular form, is fluidized by gaseous reactants flowing upwardly through the apertures 28 in the distribution plate 22. The gaseous reactant flow is controlled so that the catalytic material is fluidized at a selected height H (FIG. 1) with sufficient turbulence so that the desired reaction between the gaseous reactants occurs within the fluidized bed area 26 above the distribution plate 22 with the reaction products emerging from the fluidized bed area in the freeboard area 32 of the fluidized bed reactors 12 and 12' for discharge. In the configuration of FIG. 1, it is assumed that the reaction is endothermic and, to that end, reaction heat is provided by the heat pipes 44 with the thermal energy being absorbed in the evaporator sections of the heat pipes that extend into the generator 14 and rapidly transferred to the condenser sections where the heat energy is transferred through the fins 52 to the reactants. Since heat pipes can be considered constant temperature heat transfer devices within a relatively broad range of heat flows as determined by the selected working fluid F and the internal operating pressure of the heat pipe, the heat energy is delivered to the reactants at a relatively uniform temperature distribution. This introduction of heat energy through the heat pipes provides an advantage over coil type heat introduction systems in which the heat carrier fluid must travel through a relatively long coil, since the temperature of the heat carrier will diminish with increased path length travelled. Accordingly, the heat pipes 44 provide a functional advantage in those situations in which the reaction must take place within a relatively narrow temperature range.

The above described system is especially suited for steam methane reforming in which a gaseous hydrocarbon, such as methane, and steam function as the fluidizing reactants and inert ceramic or aluminum spheres covered with a nickel compound catalyst function as the fluidized particles. The steam and methane react in the presence of the catalyst at a temperature established by the influx of heat energy to form gaseous carbon monoxide and hydrogen as the end products. In addition to providing the catalyst on the fluidized particles, the fins 52 can be formed from or coated with the catalyst material to provide increased catalyst exposure area within the bed.

Figure 5:
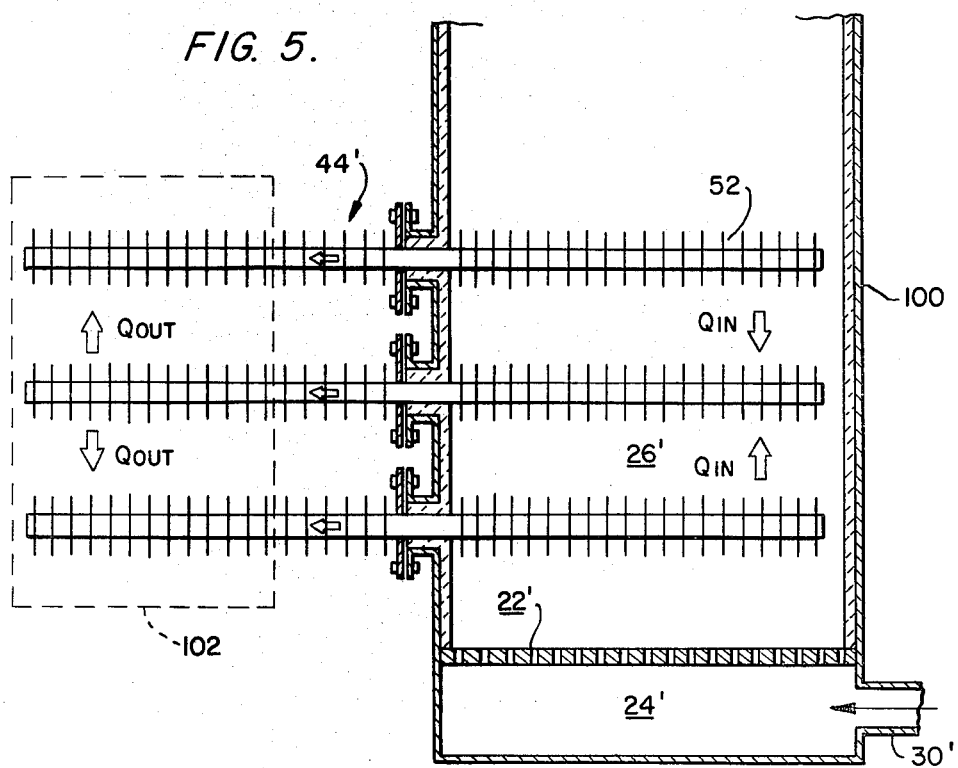
FIG. 5 is a schematic elevational view, in partial cross section, of a fluidized bed reactor in which heat energy from an exothermic reaction is removed through heat pipes to a heat sink (shown schematically in broken line illustration).

The system described above is also applicable for removing heat energy from and controlling the temperature of exothermic reactions. As schematically shown in FIG. 5, the fluid bed reactor 100 includes a plurality of heat pipes 44' with the evaporator sections of the heat pipes extending into the fluidized bed area 26'. The particulate material, such as a granulated catalyst, is fluidized by a gaseous reactant mixture with the flow rate controlled to assure sufficient residence time. The excess heat of reaction is absorbed by the evaporator sections of the heat pipes and conveyed by the above described mechanism to the condenser portions where the heat is removed in a heat sink 102 (schematically represented), for example, by radiation, forced air, convection, water cooling, or the like. Since, as mentioned above, the evaporator sections of the heat pipes 44 will absorb heat energy at a relatively constant temperature for a relatively broad range of thermal flows, heat energy can be removed from the exothermic reaction at a relatively constant temperature.

As apparent to those skilled in the art, various changes and modifications may be made to the embodiments of the fluidized bed reactor system described above without departing from the spirit and scope of the present invention as defined in the appended claims and their legal equivalent.

What is claimed is:

1. A fluidized bed reactor system comprising:
    a fluidized bed reactor that includes a vessel wall that defines an enclosed volume, an apertured distribution plate located within said reactor that defines a fluidized gas plenum beneath said distribution plate and a fluidized bed area above the distribution plate, and an inlet for introducing a gaseous fluidizing medium into said fluidized gas plenum for distribution by said apertured distribution plate into upwardly rising gas streams for fluidizing a particulate material in the fluidized bed area above said distribution plate;
    a heat generator means for generating a supply of heat energy;
    a plurality of tubular heat pipes having one end thermally coupled to said heat generator means and the other end thereof passing through said vessel wall of said fluidized bed reactor and extending into the fluidized bed area, said heat pipes being operative to transfer heat energy from said heat generator means to the fluidized bed area; and
    a weld neck nozzle secured to said vessel wall through which each of said heat pipes passes, said weld neck nozzle having a neck portion extending outwardly from said vessel with a radially extending mounting flange positioned on the remote end of said neck portion, said heat pipes including a mounting disc fixed thereto that is secured to said mounting flange by securing means.

2. The fluidized bed reactor system claimed in claim 1 wherein:
    said heat pipes are defined by a sealed, elongated hollow tube having an evaporator section positioned in said heat generator means and a condenser section positioned in the fluidized bed area said heat pipes containing a quantity of working fluid therein that is normally collected in the liquid phase in said evaporator section and vaporized thereat with the vapor transferred to said condenser section for condensation to a liquid condensate, the liquid condensate returning to said evaporator section.

3. The fluidized bed reactor system claimed in claim 1 wherein
    said neck portion of said weld neck nozzle is lined with a refractory material that extends outwardly from said mounting flange a selected distance to space said mounting disc away from said mounting flange.

4. The fluidized bed reactor system claimed in claim 3 further comprising:
   a sealing gasket means positioned between said mounting flange and spaced mounting disc to effect sealing therebetween.

5. A fluidized bed reactor system comprising:
   (1) a fluidized bed reactor means for establishing a fluidized bed therein that has a particulate nickel compound catalyst fluidized by a gaseous steam and methane mixture to effect a chemical reaction within the fluidized bed of the type that requires the addition of heat energy whereby the steam and methane mixture reacts in the presence of the nickel compound catalyst to produce carbon monoxide and hydrogen, said fluidizing bed reactor means including:
      (a) a first enclosed vessel; and
      (b) an apertured distribution plate within said vessel that defines a fluidizing gas plenum beneath said plate and the fluidized bed above said plate, the particulate nickel compound catalyst being fluidized by the flow of the steam and methane mixture through said distribution plate apertures from said fluidizing gas plenum;
   (2) a second vessel;
   (3) heat source means within said second vessel for supplying heat energy; and
   (4) heat pipe means connected between said heat source means and said fluidized bed reactor means for transferring heat energy from said heat source means to the steam and methane mixture in the fluidized bed to provide heat energy to the chemical recation, said heat pipe means including:
      (a) a plurality of heat pipes defined by elongated tubes, each heat pipe including:
         (i) a tubular portion;
         (ii) an evaporator section that passes through a second vessel wall portion and is thermally coupled to said heat source means for absorbing heat energy therefrom;
         (iii) a condenser section that passes through a first vessel wall portion and extends into the fluidized bed for delivering heat energy thereto absorbed from the heat source means; and
         (iv) a working fluid contained in each said heat pipe at a selected pressure, the fluid normally collecting in the liquid phase in said evaporator section and being vaporized thereat with the resultant vapor transferred to said condenser section for condensation to a liquid condensate, the condensate subsequently returning to said evapoator section; and
      (b) heat pipe supporting means for supporting the tubular portion of each heat pipe where the heat pipe passes through the first and second vessel wall portions, said heat pipe supporting means including:
         (i) a weld neck nozzle including an outwardly extending tubular neck portion and a radially extending flange portion; and
         (ii) a mounting disc secured to each heat pipe and to said flange portion by securing means.

* * * * *